United States Patent
Fechtel

(10) Patent No.: US 10,461,962 B2
(45) Date of Patent: Oct. 29, 2019

(54) COMMUNICATION TERMINAL AND METHOD FOR CHANNEL ESTIMATION

(71) Applicant: Intel IP Corporation, Santa Clara, CA (US)

(72) Inventor: Stefan Fechtel, Zorneding (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/776,098

(22) PCT Filed: Dec. 18, 2015

(86) PCT No.: PCT/US2015/066581
§ 371 (c)(1),
(2) Date: May 15, 2018

(87) PCT Pub. No.: WO2017/105477
PCT Pub. Date: Jun. 22, 2017

(65) Prior Publication Data
US 2019/0074999 A1 Mar. 7, 2019

(51) Int. Cl.
*H04J 11/00* (2006.01)
*H04L 25/02* (2006.01)
(Continued)

(52) U.S. Cl.
CPC ........ *H04L 25/0248* (2013.01); *H04L 25/022* (2013.01); *H04L 25/0206* (2013.01);
(Continued)

(58) Field of Classification Search
USPC ....... 370/208, 329, 335, 252, 330, 342, 203, 370/314, 328, 345, 347, 348, 349, 410,
(Continued)

(56) References Cited

U.S. PATENT DOCUMENTS

| | | |
|---|---|---|
| 2006/0176941 A1 | 8/2006 | Nieto et al. |
| 2010/0067366 A1 | 3/2010 | Nicoli |

(Continued)

FOREIGN PATENT DOCUMENTS

JP 2015012610 A 1/2015

OTHER PUBLICATIONS

GPP TS 36.211, "3rd Generation Partnership Project; Technical Specification Group Radio Access Network; Evolved Universal Terrestrial Radio Access (E-UTRA); Physical channels and modulation (Release 12)", Sep. 2015, V12.7.0.

(Continued)

*Primary Examiner* — Phuongchau Ba Nguyen
(74) *Attorney, Agent, or Firm* — Viering, Jentschura & Partner mbB

(57) ABSTRACT

A communication terminal is described comprising a receiver configured to receive pilot signal samples via a plurality of communication channels and to determine an interference matrix which includes, for each pilot signal sample, interference information representing an amount of interference included in the pilot signal sample and a channel estimator configured to determine a channel autocorrelation matrix for the plurality of communication channels and to determine a linear transformation which diagonalizes or triagonalizes the autocorrelation matrix, to transform the interference matrix by the transformation and to reduce the transformed interference matrix by discarding components corresponding to predetermined eigenvectors of the autocorrelation matrix, to determine filter weights for the signal samples based on the reduced interference matrix and to determine channel estimates by filtering the pilot signal samples using the determined filter weights.

20 Claims, 15 Drawing Sheets

(51) Int. Cl.
*H04L 25/03* (2006.01)
*H04L 27/26* (2006.01)

(52) U.S. Cl.
CPC ...... *H04L 25/0228* (2013.01); *H04L 25/0256* (2013.01); *H04L 25/03159* (2013.01); *H04L 27/2647* (2013.01)

(58) Field of Classification Search
USPC ................ 370/436, 441, 442, 473, 508, 510
See application file for complete search history.

(56) References Cited

U.S. PATENT DOCUMENTS

| | | |
|---|---|---|
| 2011/0038445 A1 | 2/2011 | Zhou et al. |
| 2013/0188757 A1 | 7/2013 | Kalyani et al. |
| 2015/0003573 A1 | 1/2015 | Fechtel et al. |
| 2015/0236872 A1 | 8/2015 | Xiong et al. |

OTHER PUBLICATIONS

International Search Report based on application No. PCT/US2015/066581 (3 pages) dated Aug. 24, 2016.
Lee et al.; "Low-rank pilot-symbol-aided channel estimation for MIMO-OFDM systems"; dated 2004, published in IEEE 60th Vehicular Technology Conference; vol. 1; Sep. 26, 2004; pp. 469-473, IEEE Piscataway, New Jersey, USA.
Extended European Search Report issued for corresponding application No. 15910943.8, dated Jun. 5, 2019, 10 pages (for informational purpose only).

COMMUNICATION TERMINAL AND METHOD FOR CHANNEL ESTIMATION

CROSS-REFERENCE TO RELATED APPLICATION

The present application is a national stage entry according to 35 U.S.C. § 371 of PCT application No.: PCT/US2015/066581 filed on Dec. 18, 2015, and is incorporated herein by reference in its entirety and for all purposes.

TECHNICAL FIELD

Embodiments described herein generally relate to communication terminals and methods for channel estimation.

BACKGROUND

A vital part of the functionality of a radio receiver in a mobile radio communication system is channel estimation, which may significantly improve the performance of data transmission, especially for 4G Long Term Evolution (LTE) systems. In such systems, channel estimation is typically done by estimating the time-varying channel frequency response for OFDM (Orthogonal Frequency Division Multiplexing) symbols based on pilot signals. However, channel estimation may require substantial computational resources, especially in the case of channel selectivity and interference selectivity. Accordingly, approaches that allow efficient channel estimation in such scenarios are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
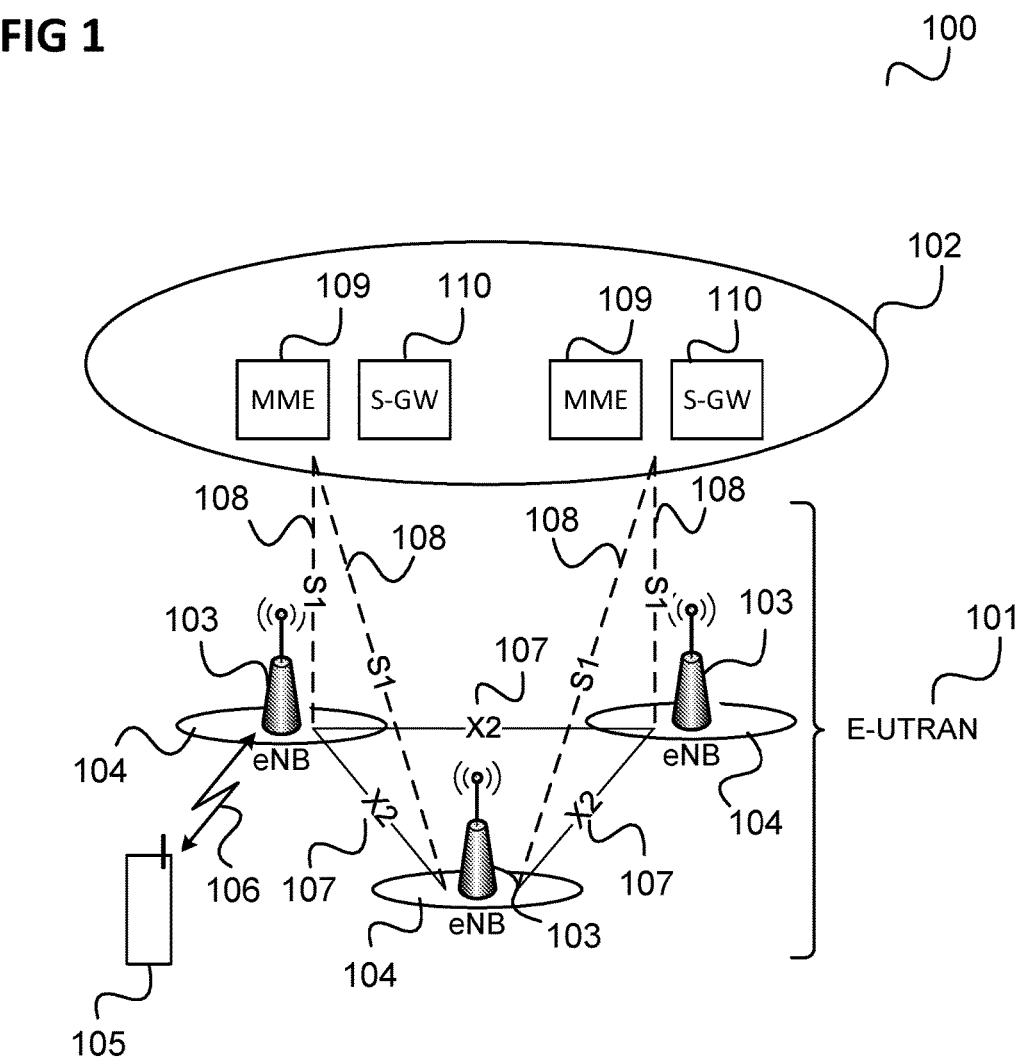
FIG. 1 shows a communication system, for example according to LTE (Long Term Evolution).

FIG. 1 shows a communication system 100 according to an embodiment, for example according to LTE (Long Term Evolution).

The communication system 100 includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) in the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

Data transmission between the mobile terminal 105 and the corresponding base station 103 (i.e. the base station operating the radio cell in which the mobile terminal 105 is located) is carried out in accordance with a (radio) frame structure. An example for a frame structure, denoted as frame structure type 1, is shown in FIG. 2.

Figure 2:
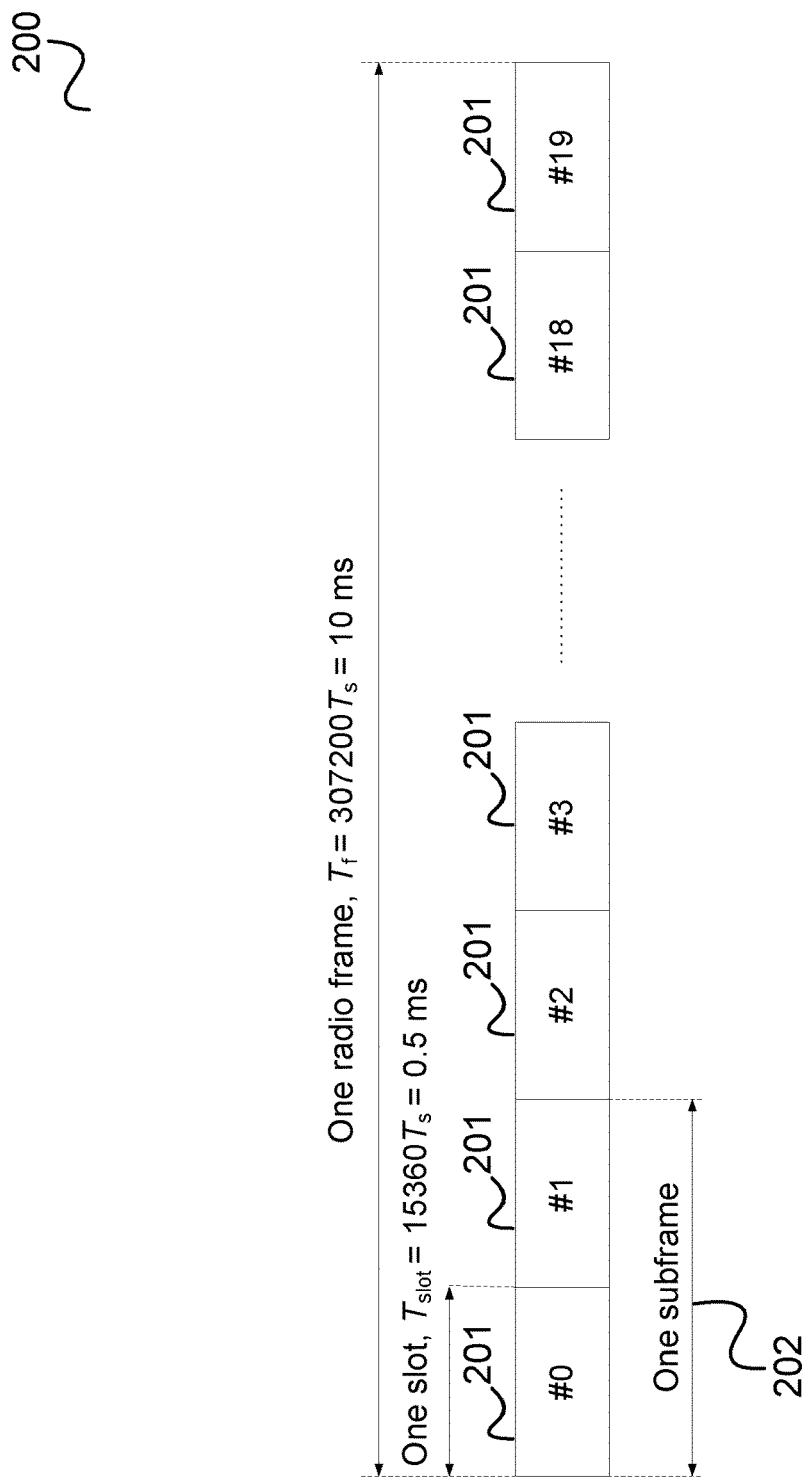
FIG. 2 shows a radio frame.

FIG. 2 shows a frame 200 in accordance with an embodiment.

The LTE frame 200 is 10 ms long and consists of 20 slots 201 of length 0.5 ms, numbered from 0 to 19. A subframe 202 is defined as two consecutive slots 201. In each 10 ms interval 10 subframes 202 are available for downlink transmissions or uplink transmissions. Uplink and downlink transmissions are separated in the frequency domain (FDD) or time domain (TDD). Depending on the slot format a subframe 202 may include 14 or 12 OFDMA (orthogonal frequency division multiple access) symbols in DL (downlink) and 14 or 12 SC-FDMA symbols in UL (uplink), respectively.

Figure 3:
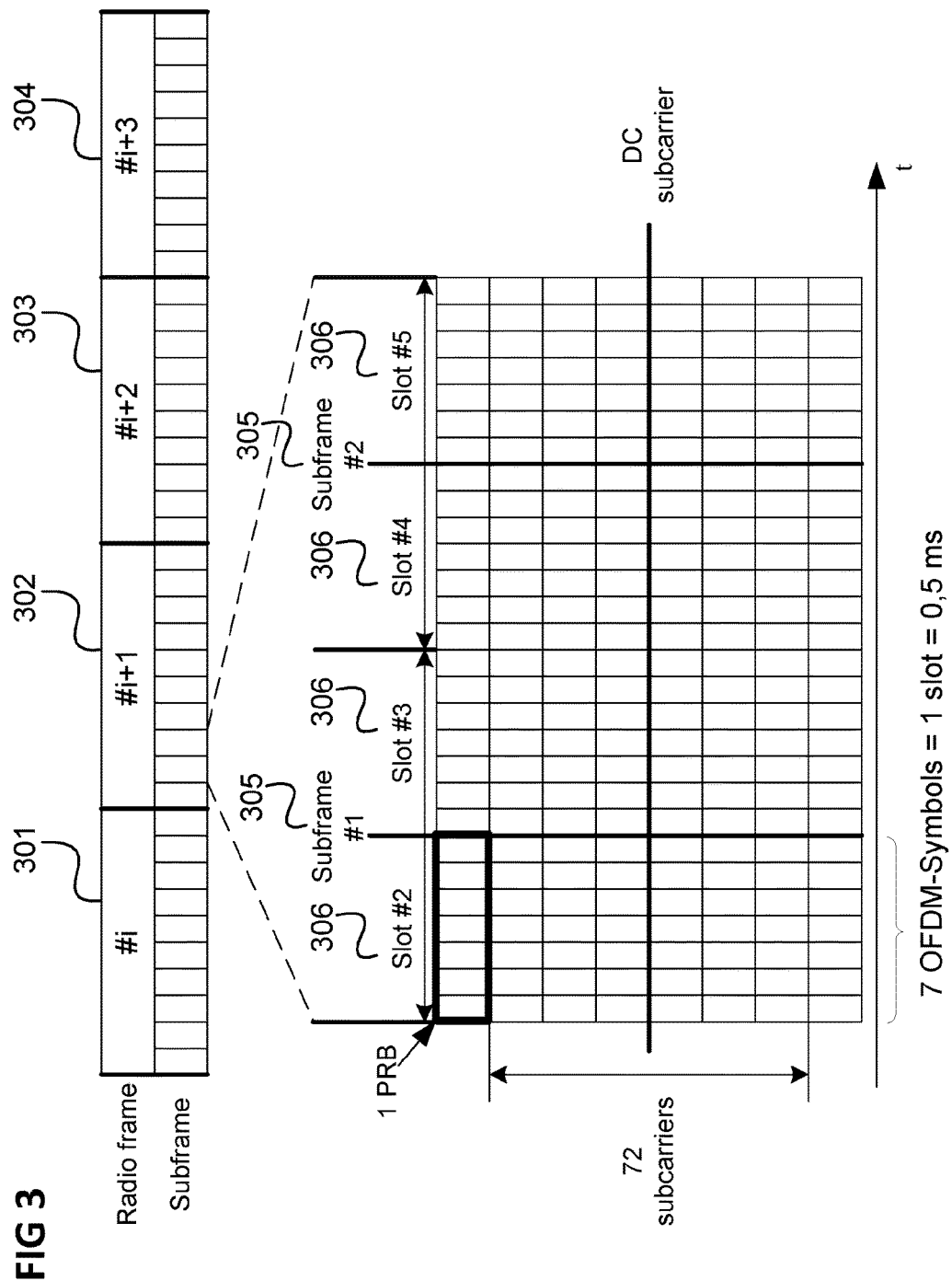
FIG. 3 shows an OFDM symbol allocation.

FIG. 3 shows an OFDM symbol allocation according to one non-limiting embodiment.

Four radio frames 301, 302, 303, 304 are shown in FIG. 3, each having the structure as explained above with reference to FIG. 2, i.e. each including 10 subframes 305 wherein each subframe 305 includes two slots 306.

In this embodiment, each slot includes 7 OFDM-symbols for each of 72 sub-carriers.

A physical resource block (PRB) is the baseline unit of allocation for the physical channels defined in LTE. A physical resource block includes a matrix of 12 subcarriers by 7 (or 6) OFDM symbols. A pair of one OFDM symbol and one subcarrier is denoted as resource element.

Figure 4:
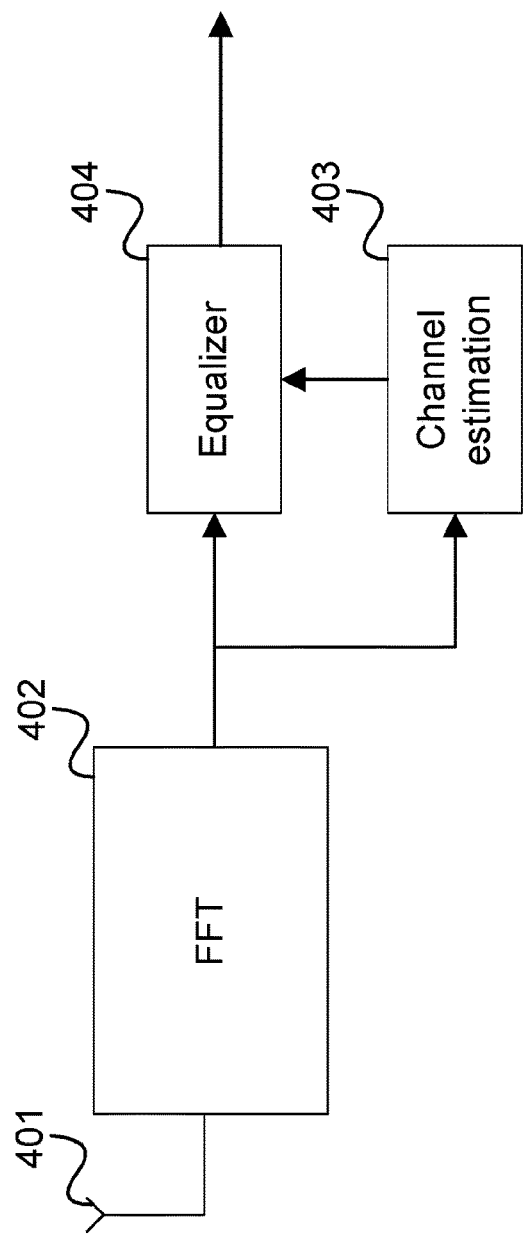
FIG. 4 illustrates an architecture of a communication terminal illustrating the reception of a wireless signal.

FIG. 4 illustrates an architecture of a communication terminal 400 illustrating the reception of a wireless signal.

The communication terminal 400 for example corresponds to the mobile terminal 105 receiving a wireless signal from a base station 103. It is assumed that the wireless signal is an OFDM signal. The communication terminal 400 comprises an antenna 401 which, e.g. after frontend processing and analog to digital conversion, supplies the wireless signal samples to an FFT block 402 which performs a fast Fourier transformation. Of the resulting transformed signal samples, those which correspond to pilot signals are supplied to a channel estimator 403 and those which correspond to control or useful data are supplied to an equalizer 404. The channel estimator 403 generates a channel estimate based on the pilot signal samples it receives from the FFT block 402 and supplies the channel estimate to the equalizer 404 which performs an equalization of the samples it receives from the FFT block 402 based on the channel estimate and supplies the result to components performing further processing such as symbol demapping, decoding etc.

At a certain geographic location different communication networks may be operated which operate according to different RATs (radio access technologies, e.g. UMTS, LTE, WLAN (wireless local area network)) which thus results in a heterogeneous (overall) mobile network.

In both homogenous and heterogeneous mobile networks, a mobile user equipment (such as UE 105) is typically faced not only with varying channel conditions but also with multiple interfering cells whose signals and channels likewise exhibit time/frequency-selective behavior. Channel estimation for OFDM-based systems such as for LTE-Advanced is required to be adaptive to such potentially highly dynamic conditions. Channel estimation filtering, which is key to proper receiver operation in a mobile terminal, therefore faces multiple challenges which can be grouped into the following categories:

(R) reference signal configuration: the reference signal (RS) pattern (in the time-frequency plane as illustrated in FIG. 3), as well as the resource element positions for which the channel is to be estimated, may dynamically change, depending on the standard, transmission mode, logical channel (in LTE, e.g., CRS (cell-specific reference signals) for PDCCH (Physical Downlink Control Channel) and TM (Transmission Mode) 1-6 PDSCH (Physical Downlink Shared Channel), DMRS (demodulation reference signal) for TM7-10 PDSCH), time (first/last slots, TDD (time division duplex) special SF (Scaling Factor), MBSFN (Multicast Broadcast Single Frequency Network) SF, etc.), and frequency (edges of OFDM spectrum).

(C) channel parameters: time-variant physical channel parameters, in particular, delay spread and shift and Doppler spread and shift.

(I) interference parameters: depending on the interfering cell scheduling, the SIR levels may be strongly dynamic across the 2D time-frequency plane of the post-FFT (Fast Fourier Transform) OFDM signal. In LTE-A FeICIC (Further Enhanced Inter-cell Interference Coordination) and NAICS (Network-Assisted Interference Cancellation and Suppression), the interference may change per physical resource block (PRB), hence the dynamic SIR pattern granularity may be as small as one PRB.

(N) noise parameters: level of thermal noise and background interference;

(S) synchronization errors: frontend/AGC (Automatic Gain Control) non-idealities affecting channel estimation.

Channel estimators typically comprise a number of predefined filter sets matched to a set of RS (reference signals) and quantized channel and noise parameters. These coefficients are typically precomputed offline, stored in memory, and retrieved for filtering when needed. A more versatile two-step architecture comprises semi-static coefficient prototype generation (based on the set of slowly changing parameters) and dynamic coefficient synthesis from the prototype (based on the set of fast changing parameters).

While dynamic coefficient synthesis from a prototype does improve robustness, its performance is found to be suboptimal in the case of highly selective interference observed in some FeICIC scenarios. This is because prototype weighting cannot account for strongly interfered RS samples (low SINR (signal to interference and noise ratio)) coexisting with clean (i.e. weakly interfered) RS samples (high SINR) in the same filter. To mitigate this, a possibility is to switch between prototype weighting (moderate SINR variations) and short filtering (strong SINR variations). However, this workaround is still suboptimal and requires dynamic switching between two different filter configurations.

Optimal Wiener filtering (WF) may be used for channel estimation, but fast online computation of Wiener coefficients (per PRB) may be too costly, especially for longer filters.

In the following, an approach for quasi-optimal channel estimation filter coefficient computation in the presence of dynamic and highly selective interference is described which may be implemented with low complexity. It includes:

(1) generation of a semi-static set of coefficient synthesis parameters based on the system parameters (reference signal parameters, channel parameters, such as delay spread and Doppler shift and noise parameters) which are slowly changing with time, (2) computation of dynamic CE (channel estimation) coefficients from the synthesis parameters of (1) and those system parameters (in particular, interference) which are dynamically changing with time.

Figure 5:
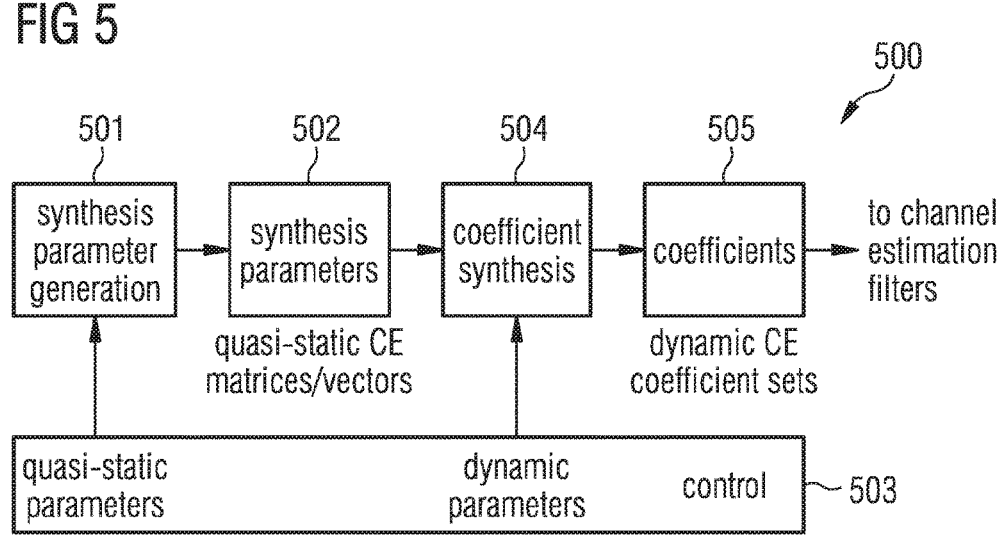
FIG. 5 shows a block diagram of a channel estimation coefficient generator.

FIG. 5 shows a block diagram of a channel estimation coefficient generator 500 illustrating this approach.

The channel estimation coefficient generator 500 is for example included in the channel estimator 403 and generates filter coefficients for a filter used for filtering the pilot symbol samples provided by the FFT 402.

The channel estimation coefficient generator 500 comprises a synthesis parameter generation block 501 which generates synthesis parameters 502 based on quasi-static parameters (such as Doppler spread and shift and delay spread and shift) provided by a controller 503 and a coefficient synthesis block 504 which receives the synthesis parameters 502 and generates filter coefficients based on dynamic parameters (SINRs for the pilot signal samples) provided by the controller 503.

It should be noted that channel estimation and all other functions relying on it such as detection and parameter estimation benefit from dynamic CE coefficient generation in many respects:

The quasi-static synthesis parameters may be generated on demand, i.e., only when necessary and only for relevant sets of system parameters (reference signal parameters, channel parameters, such as delay spread and Doppler shift and noise parameters), thus saving processing power and reducing the memory footprint.

Likewise, dynamic CE coefficients may be generated on demand, i.e., when interference is actually present and its SIR pattern is changing significantly within the span of CE filtering. This adaptive on-demand processing serves both dynamic (FeICIC/NAICS) and legacy (slowly changing) environments.

The CE coefficients may be generated to be (quasi-)optimal, regardless of the selectivity and dynamics of the interference profile (on top of the selectivity of the channel). Hence, this approach supersedes the (hitherto separate) functions "weighting" and "short filtering."

This kind of on-demand processing allows achieving a much reduced complexity with respect to conventional computation of optimal Wiener filter coefficients.

Figure 6:
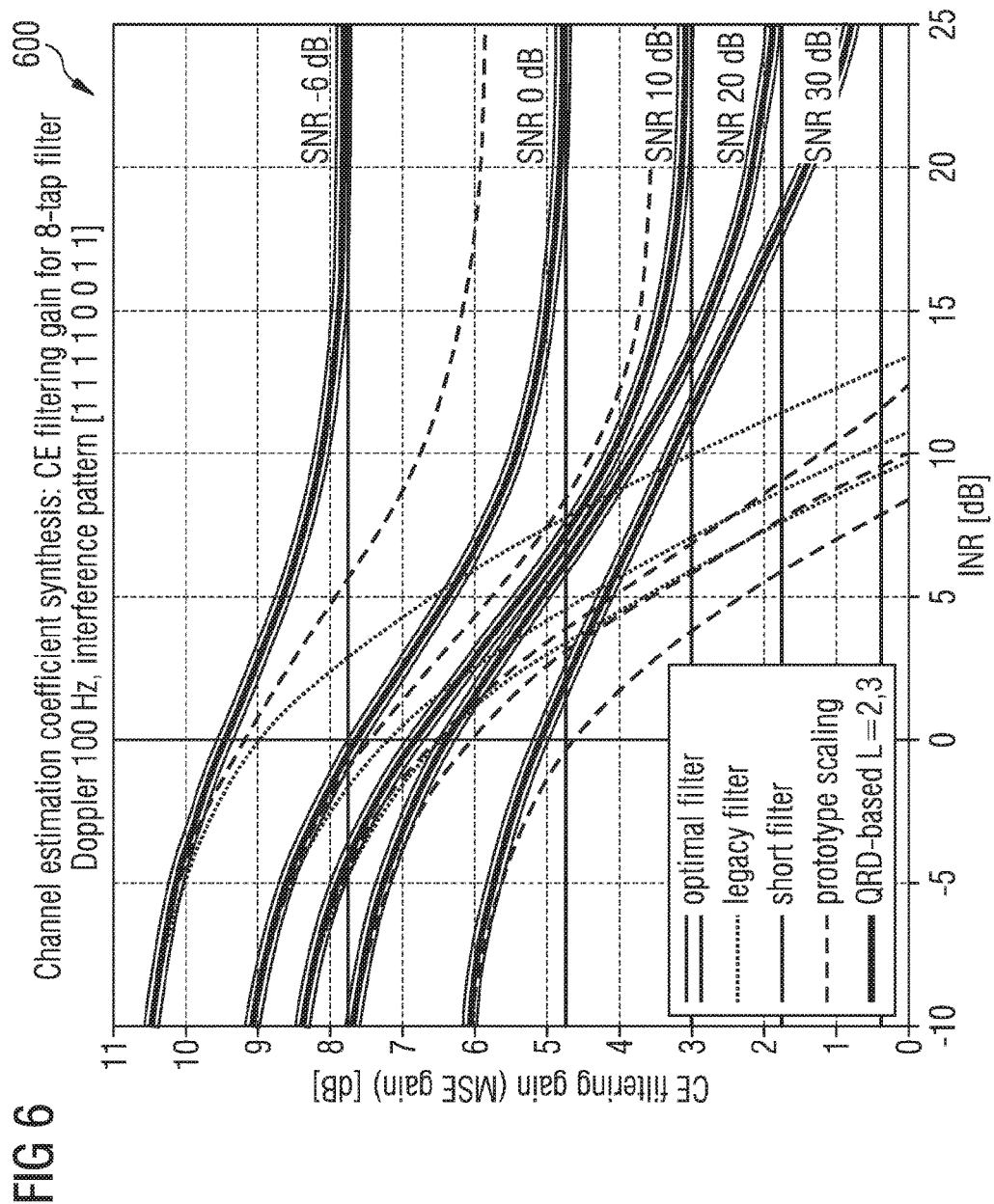
FIG. 6 illustrates the performance of channel estimation for various different approaches.

FIG. 6 illustrates that with the approach illustrated in FIG. 5 (and further detailed below) an MSE performance (QR-decomposition-based as explained below) may be achieved which is actually optimal in the entire SNR and INR range, in contrast to that of alternatives such as a legacy filter, a short filter, a whitening filter and prototype scaling.

In the following, the operation of the channel estimation coefficient generator 500 is described in more detail.

The optimal N-dimensional coefficient vector $w_{t,opt}$ (for a length-N Wiener filter) for estimating the channel coefficient $\hat{h}_{t,opt} = w_{t,opt}^H y$ at target (sample) position t from a received N-dimensional reference signal (RS) vector y=h+n (after demodulation) is given by $$w_{t,opt} = (R_h + \Sigma)^{-1} r_{th} \quad \text{(Eq 1)}$$

with $R_h = E[hh^H]$ being the N×N RS channel autocorrelation matrix (ACM), $r_{th} = E[hh^*_t]$ being the cross-correlation vector (CCV) between the RS samples and the target RE (i.e. the position for which the channel estimation value is to be calculated), and $\Sigma = E[nn^H]$ being the noise ACM which for the selective SINR scenario reads $$\Sigma = \text{diag}(\sigma_1^2, \sigma_2^2, K\sigma_N^2) \quad \text{(Eq 2)}$$

wherein $\sigma_n^2$ (n=1, ..., N) is the noise power on n-th RS sample.

Figure 7:
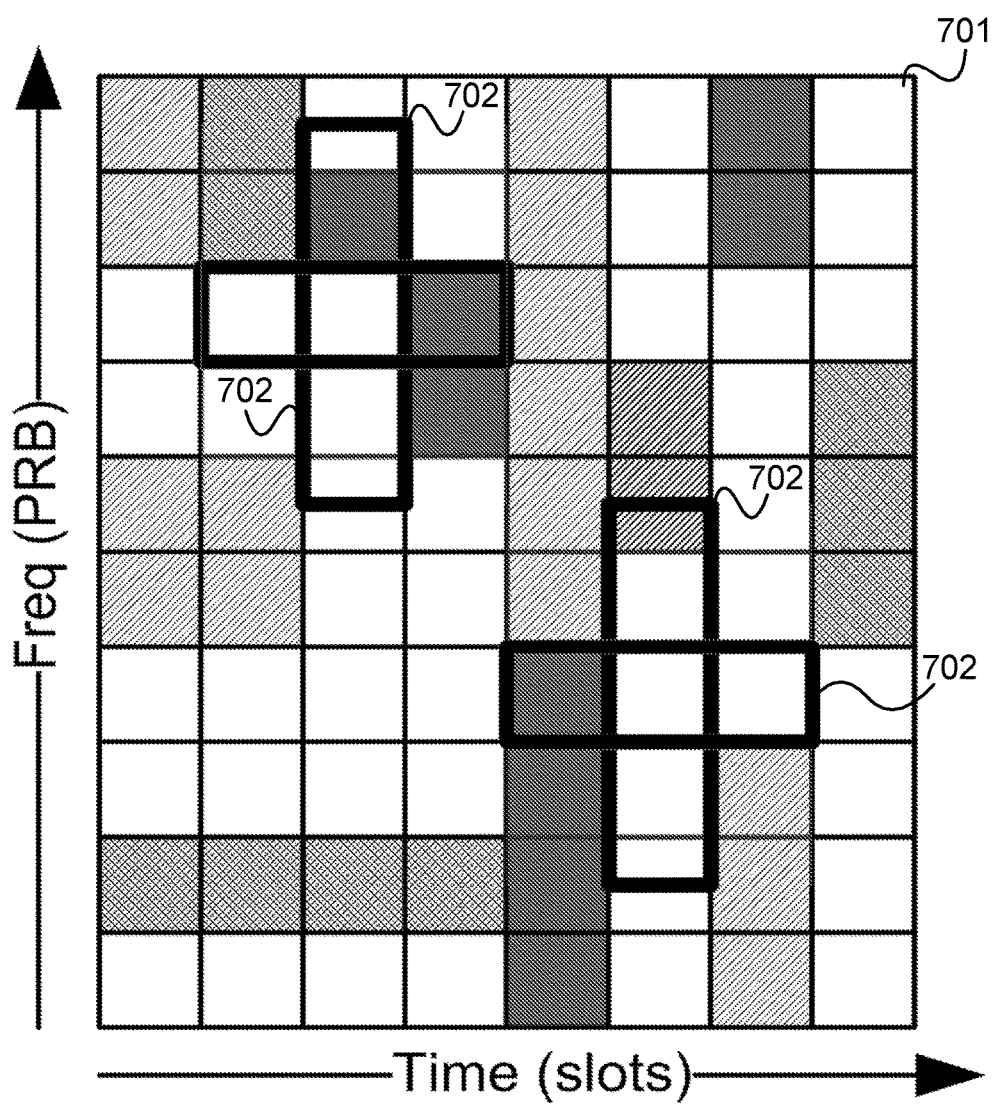
FIG. 7 illustrates a selective SINR scenario.

FIG. 7 illustrates the selective SINR scenario.

In FIG. 7, corresponding to FIG. 3, a plurality of physical resource blocks are shown in the time-frequency plane, wherein each physical resource block is represented by a square 701 which corresponds to a pair of a time slot and a physical resource block frequency range (12 subcarriers). In FIG. 7, darker (or more strongly shaded) PRBs indicate PRBs which are more strongly disturbed by interference. PRBs included in one of rectangles 702 represent PRBs which are processed together in one filtering operation, wherein for example, at first samples of 9 PRBs may be combined horizontally by combining samples of three of the PRBs in one filtering operation and the three results may then be combined vertically in one filtering operation, wherein from each PRB, also more than one samples (e.g. two samples) may be used.

Reduced-complexity CE coefficient generation can be devised via an analysis of the eigenstructure of the channel. Any technique enabling this structural analysis can be applied, in particular, eigenanalysis $R_h = V_h \Lambda_h V_h^H$, QR decomposition $R_h = V_h U_h$, or Cholesky decomposition $R_h = L_h [D_h] L_h^H$. Without loss of generality, in the following description, the focus is on the eigenanalysis of the observation ACM $R = R_h + \Sigma$ (Eq 1) and its inverse $Q = R^{-1}$ $$R = V_h(\Lambda_h + V_h^H \Sigma V_h) V_h^H Q = V_h(\Lambda_h + V_h^H \Sigma V_h)^{-1} V_h^H \quad \text{(Eq 3a)}$$

with $R_h = V_h \Lambda_h V_h^H$ and $\lfloor V_h, \Lambda_h \rfloor = \text{eig}(R_h)$ (Eq 3b)

Depending on the channel selectivity, the N-dimensional channel ACM $R_h$ is reducible to dimension L<N, i.e., $R_h \cong V_L \Lambda_L V_L^H$ with reduced (ordered) eigenvalue and—vector matrices $\Lambda_L = \Lambda_h(1:L,1:L)$ (L×L) and $V_L = V_h(1:N,1:L)$ (N×L), respectively. Here, $R_h \cong V_L \Lambda_L V_L^H$ may for example mean that $\Lambda_L$ contains all eigenvalues of $R_h$ which are non-zero (within a certain accuracy, e.g. which lie above a certain threshold such as $10^{-5}$ or $10^{-10}$). However, also larger eigenvalues of $R_h$ may be omitted.

For example, the following approaches may be used for selecting the dimension L

1) L is predetermined and the L largest eigenvalues (and the corresponding eigenvectors) are kept, i.e. L is fixed (optimality is not ensured).
2) Setting a threshold, e.g. $10^{-5}$ and all eigenvalues above the threshold are kept, i.e. L is variable.
3) Setting a tolerance for the performance loss, for example, an MSE loss of 0.1 dB with respect to the optimum. L is selected such that the tolerance for the performance loss is just not being exceeded.

In the case of non-selective interference, the noise ACM $V_h^H \Sigma V_h = \sigma^2 I_N$ is easily reducible to dimension L×L as well. However, in the case of selective interference, the matrix $V_h^H \Sigma V_h$ is no more diagonal and hence not reducible to L×L, so that the inner matrix $\Lambda_h + V_h^H \Sigma V_h$ to be inverted (Eq 3a) remains a full-size (N×N) matrix.

The desired reduction of complexity is made possible by deriving an equation which is equivalent to (Eq 1) but appropriate for reduction. After several reformulations, the following form can be derived:

$$w_t = \Gamma V_h (I + \Lambda_h V_h^H \Gamma V_h)^{-1} V_h^H r_h \quad \text{(Eq 4a)}$$

$$\Gamma = \Sigma^{-1} = \text{diag}(\gamma_1, \gamma_2, K, \gamma_N) \quad \text{(Eq 4b)}$$

wherein $\gamma_n$ is the SINR on n-th RS sample and with the SINR matrix $\Gamma$ (N×N).

Despite SINR selectivity, expression (4a) is reducible, i.e., for sufficient L $$V_h(I_N + \Lambda_h V_h^H \Gamma V_h)^{-1} V_h^H \cong V_L(I_L + \Lambda_L V_L^H \Gamma V_L)^{-1} V_L^H,$$

so that the computation of (quasi-)optimal CE coefficients (target index t dropped) reduces to $$w = \Gamma V_L C_L V_L^H r_h \quad \text{(Eq 5)}$$

with $C_L = (I_L + \Lambda_L V_L^H \Gamma V_L)^{-1}$.

The formulation of (Eq 5) can be cast into a vector space framework. In particular, the original N-dimensional CE coefficients w (Eqs 1,5) in observation space $S_N$ can be expressed in terms of L-dimensional coefficients b in subspace $S_L$, and vice versa:

$$w = V_r b \text{ with } V_r = \Gamma V_L \quad \text{(Eq 6a)}$$

$$b = C_L c_h \text{ with } c_h = V_L^H r_h \quad \text{(Eq 6b)}$$

For sufficiently large L, the reduced-dimension quantities $c_h$ (L-dimensional CCV) and $b = C_L c_h$ (L-dimensional coefficients) are sufficient statistics of their N-dimensional counterparts $r_h$ and $w_t$ respectively. In contrast to the common mapping (reduced eigenvector matrix $V_L$), the linear mapping represented by matrix $V_\Gamma$ (Eq 6a) between the subspaces now explicitly includes the SINR matrix.

Figure 8:
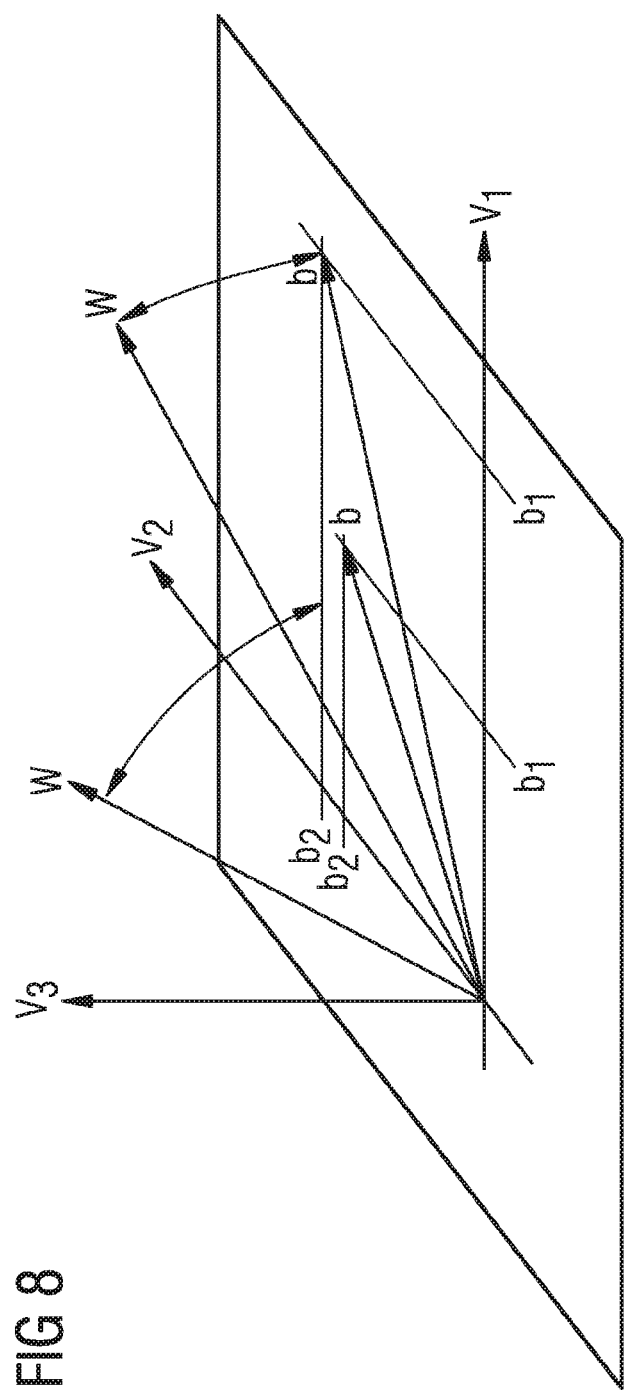
FIG. 8 illustrates a linear mapping according to an approach to determine channel estimation coefficients.

FIG. 8 illustrates the benefit of this mapping.

Two different CE coefficients ware shown which can be anywhere in the N-dimensional observation space (in FIG. 8 spanned by basis vectors $v_1$, $v_2$, and $v_3$). By virtue of the mapping represented by $V_\Gamma = \Gamma V_L$, all reduced coefficients b reside in the L-dimensional subspace $S_L$ (here spanned by $v_1$ and $v_2$).

As in the non-selective SINR case, the required dimension L can be determined in advance as a function of channel selectivity and SNR (max SINR). For the example as illustrated in FIG. 6, subspace dimensions as low as L=2 (lower SNR, upper two curves) or 3 (higher SNR, lower two curves) suffice for quasi-optimal performance (e.g. a MSE (mean squared error) loss of less than 0.1 dB).

Figure 9:
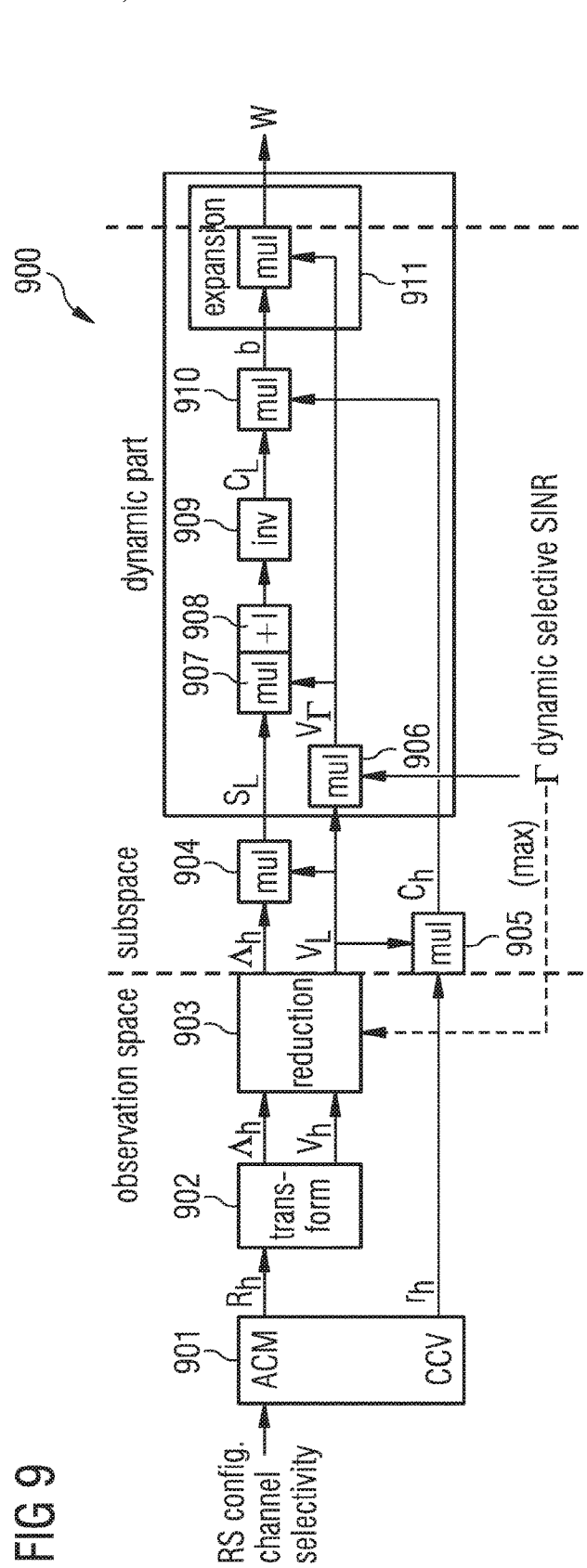
FIG. 9 shows a channel estimation coefficient generator in more detail.

FIG. 9 shows a channel estimation coefficient generator 900 which is based on the above approach of subspace CE coefficient synthesis (here eigensystem-based), in particular according to Eq. 5, 6a and 6b.

The channel estimation coefficient generator 900 provides on-demand computation of quasi-static synthesis parameters (here $\Lambda_h$, $V_h$, their reduced counterparts $\Lambda_L$, $V_L$, and quantities $S_L = V_L \Lambda_L$ and $c_h = V_L^H r_h$), followed by dynamic computation of the mapping $V_\Gamma = \Gamma V_L$ (Eq 6a), inverse matrix $C_L = (I_L + \Lambda_L V_L^H \Gamma V_L)^{-1}$ (Eq 5), coefficients $b = C_L c_h$ (Eq 6b), and expansion $w = V_\Gamma b$ (Eq 6a). It should be noted that all critical dynamic operations are done in the reduced-dimension subspace (rather than the original observation space like the static part).

Specifically, the channel estimation coefficient generator 900 comprises a correlation generator 901 which is supplied with reference signal parameters and channel parameters, such as delay spread and Doppler shift and noise parameters and an indication of channel selectivity and outputs, e.g. based on corresponding models and statistical assumptions, the channel autocorrelation matrix $R_h$ and the cross-correlation vector $r_h$. A transformation block 902 performs an eigendecomposition of $R_h$ according to Eq 3b, or, in other words, transforms the matrix $R_h$ into the diagonal matrix $\Lambda_h$. The matrix $\Lambda_h$ as well as the transformation matrix $V_h$ are supplied to a reduction block 903 which reduces $\Lambda_h$ and $V_h$ to $\Lambda_L$ and $V_L$, respectively. The reduction block 903 may receive SINR information, e.g. the matrix $\Gamma$, and determine the value of L based on the SINR information.

A first multiplier 904 receives $V_L$ and $\Lambda_L$ and generates $S_L = V_L \Lambda_L$, a second multiplier 905 receives $V_L$ and $r_h$ and generates $c_h = V_L^H r_h$ and a third multiplier 906 receives $V_L$ and $\Gamma$ and generates $V_\Gamma = \Gamma V_L$. A fourth multiplier 907 receives $V_\Gamma$ and $S_L$ and an adder 908 adds the unity matrix I to the result to generate $I_L + \Lambda_L V_L^H \Gamma V_L$ which is inverted by an inverter 909 to generate $C_L = (I_L + \Lambda_L V_L^H \Gamma V_L)^{-1}$. A fifth multiplier 910 receives $C_L$ and $C_h$ and generates $b = C_L c_h$ which is supplied, together with $V_\Gamma = \Gamma V_L$, to an expansion block 911 which generates the filter weights $w = V_\Gamma b$.

It should be noted that the approach described above with reference to FIG. 9 covers any kind of SINR selectivity, including brick-wall SINR steps as large as several tens of dB. Moreover, this approach can also be used for online coefficient computation of filters dynamically "shortened" due to the lack of some input RS samples (e.g., special subframes, edges of OFDM). By assigning very low SINR $\gamma_n \to 0$ to the "missing" taps (e.g. samples that are not available), the algorithm is prompted to produce coefficients $w_n \to 0$ for these taps and optimal coefficients $w_n$ for the other taps.

The third multiplier 906, the fourth multiplier 907, the adder 908, the inverter 909, the fifth multiplier 910 and the expansion block 911 form the dynamic part and are for example part of the coefficient synthesis block 502. The correlation generator 901, the transformation block 902, the reduction block 903, the first multiplier 904 and the second multiplier 905 from the static part and are for example part of the synthesis parameter generation block 901.

For example, in case of non-selective interference, the channel estimation coefficient generator 500 generates the channel estimation coefficients based on the results of the static part and only if selective interference is detected it activates the dynamic part to generate the channel estimation filter coefficients using the dynamic part. For example, selective interference (or interference selectivity) may be detected based on whether the different of interference between neighboring communication channels or neighboring time slots, i.e. neighboring PRBs, e.g. PRBs whose samples are combined in the channel estimation filtering, lies above a predetermined threshold.

It should be noted that interference selectivity may be understood to be present if the spread of the SINRs of the samples (see Eq. 4b) is above a threshold, i.e. $\gamma_{max}/\gamma_{min} > \theta$ with for example $\theta = 2$ (3 dB).

Further, the channel estimation coefficient generator 500 may also apply QRD-based coefficient synthesis, including simplified quasi-static parameter computation (single QRD) and a dynamic part similar to the one of FIG. 9.

It should be noted that in case of QR decomposition $R_h = V_h U_h$ the matrix $R_h$ is not completely diagonalized but decomposed into an upper triangular matrix $U_h$ and a unitary matrix $V_h$. The diagonal elements of $U_h$ may be used for determining L and the processing is similar to the one described with reference to FIG. 9.

Figure 10:
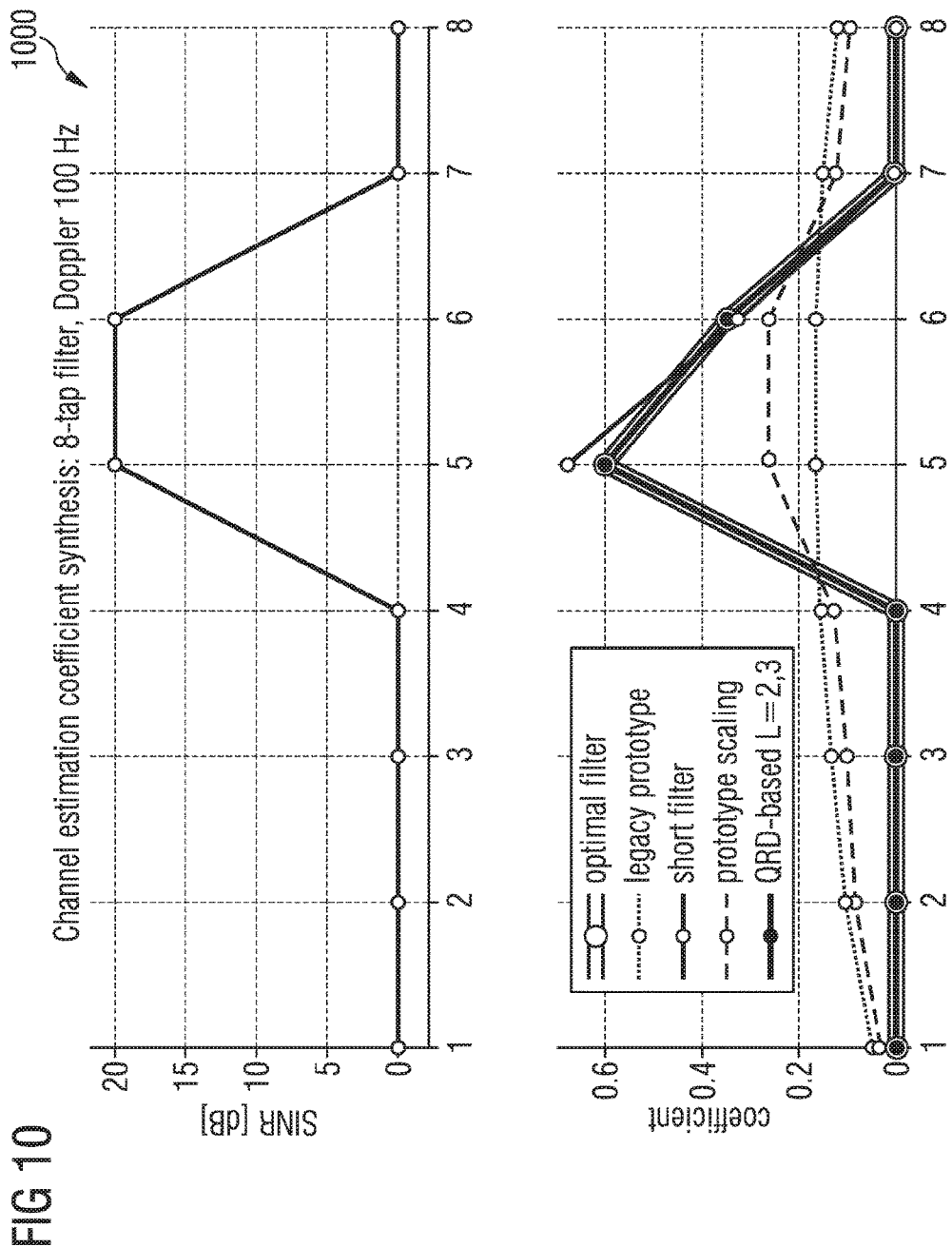
FIG. 10 illustrates channel estimation coefficients generated by the channel estimation coefficient generator of FIG. 9 in comparison with other channel estimation coefficient generation approaches.
Figure 11:
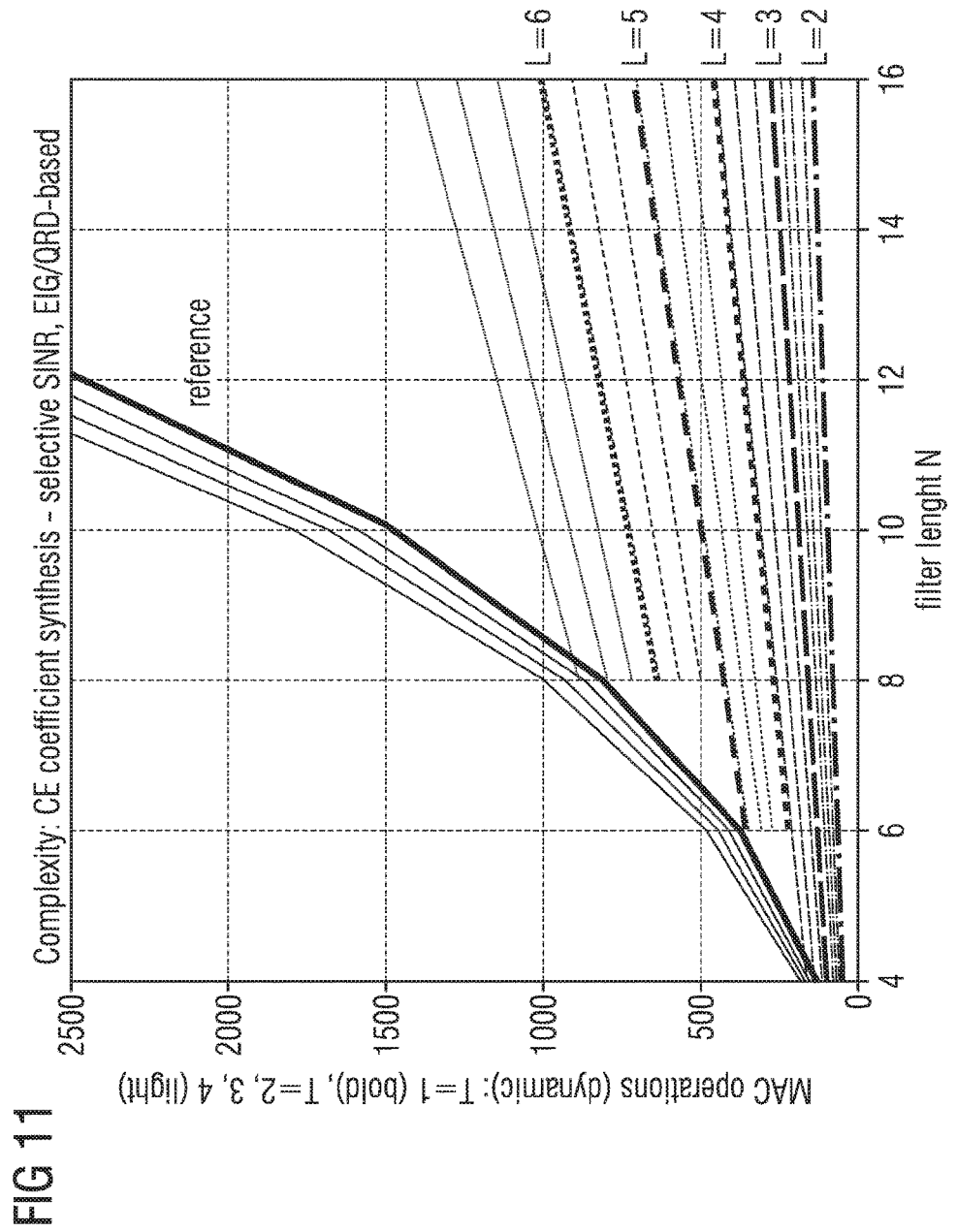
FIG. 11 illustrates the complexity of various channel estimation coefficient generation approaches.

FIG. 10 illustrates CE coefficients (for the example of FIG. 6) generated by the channel estimation coefficient generator 900. Very noisy RS (SIR 0 dB) correspond to $w_n \to 0$ as expected, whereas the alternative approaches produce coefficients which are not well matched to such SINR profiles and hence are suboptimal. FIG. 11 illustrates the complexity (same for both eigensystem- and QRD-based) per dynamic coefficient generation. Compared with the baseline (full N-dimensional QRD), subspace coefficient synthesis requires much less MAC (multiply-accumulate operations), especially for higher filter lengths N and low/moderate subspace dimensions L.

Figure 12:
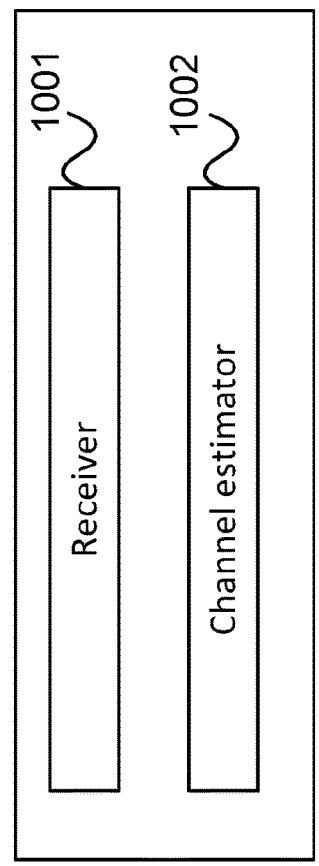
FIG. 12 shows a communication terminal.

In summary, according to various examples, a communication terminal as illustrated in FIG. 12 is provided.

FIG. 12 shows a communication terminal 1200.

The communication terminal 1200 comprises a receiver 1201 configured to receive pilot signal samples via a plurality of communication channels and to determine an interference matrix which includes, for each pilot signal sample, interference information representing an amount of interference included in the pilot signal sample.

The communication terminal 1200 further comprises a channel estimator configured to determine a channel autocorrelation matrix for the plurality of communication channels and to determine a linear transformation which diagonalizes or triagonalizes the autocorrelation matrix, to transform the interference matrix by the transformation and to reduce the transformed interference matrix by discarding components corresponding to predetermined eigenvectors of the autocorrelation matrix, to determine filter weights for the signal samples based on the reduced interference matrix and to determine channel estimates by filtering the pilot signal samples using the determined filter weights.

In other words, for example, the SINR matrix (having, for each sample, an entry on its diagonal specifying the SINR of the sample) is transformed according to the linear transformation (i.e. the change of basis) which diagonalizes or triagonalizes the autocorrelation matrix and the resulting matrix is reduced (i.e. the ith row and the ith column are omitted for one or more i) and the reduced matrix is used for determining channel estimation filter coefficients which for example involves an inversion of a sum including the reduced matrix.

The approach described with reference to FIG. 12 may be used for online channel estimation (CE) filter coefficient computation and allows (1) handling both types of selectivity simultaneously, i.e., channel selectivity (delay and Doppler) and interference selectivity (SINR profile) in the same estimation filter, (2) coping with any selective interference profile, including highly selective ones where strongly interfered RS samples (very negative SIR) coexist with clean RS samples (high SNR), (3) coping with very dynamic interference profiles (changing fast, per resource block), (4) achieving quasi-optimal performance (close to that of Wiener filtering), and (5) channel estimation with lowest complexity (much lower than Wiener coefficient computation).

Figure 13:
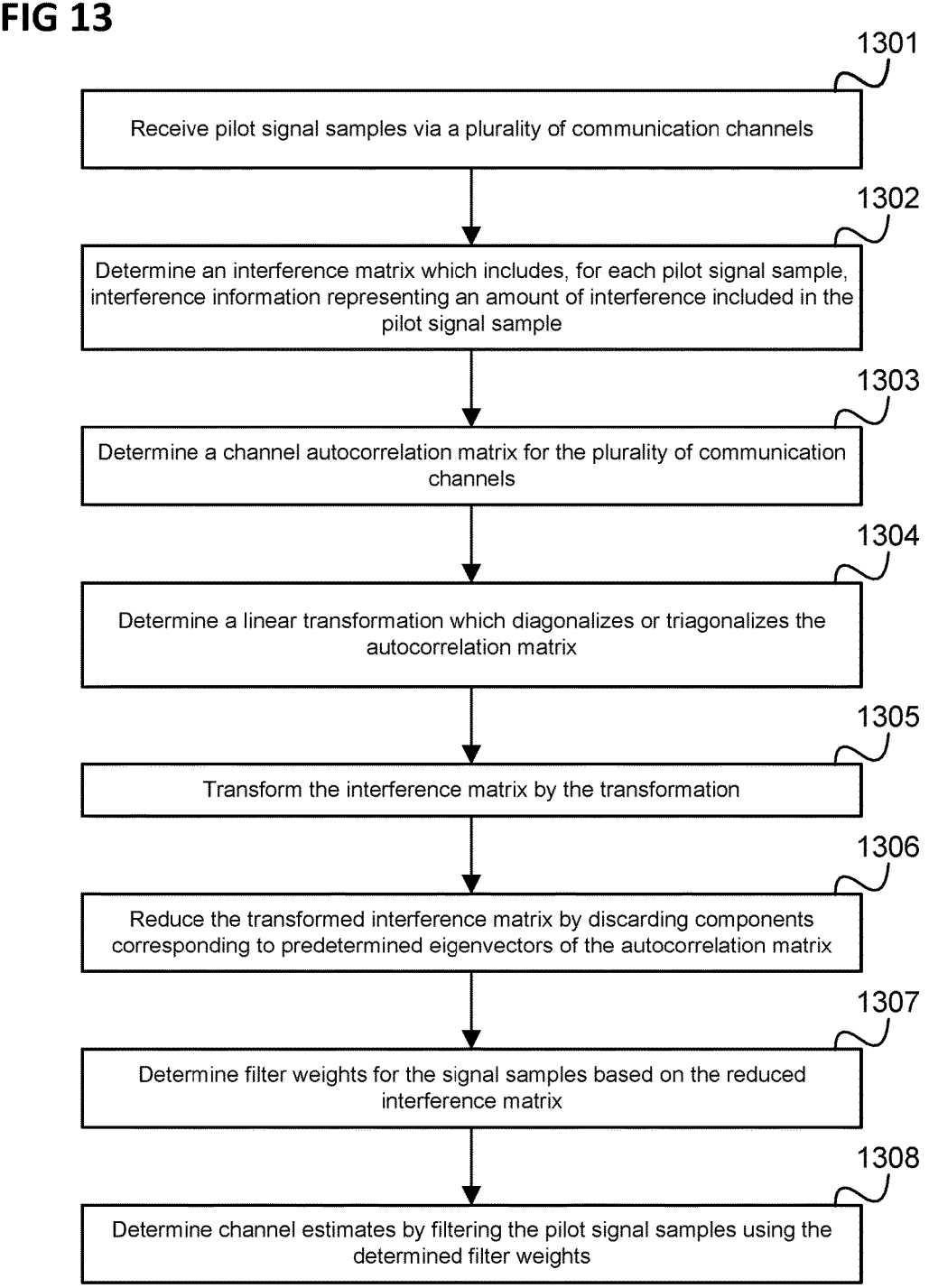
FIG. 13 shows a flow diagram illustrating a method for channel estimation.

The communication terminal 1200 for example carries out a method for channel estimation as illustrated in FIG. 13.

FIG. 13 shows a flow diagram 1300 illustrating a method for channel estimation, for example carried out by a communication terminal.

In 1301, the communication terminal receives pilot signal samples via a plurality of communication channels.

In 1302, the communication terminal determines an interference matrix which includes, for each pilot signal sample, interference information representing an amount of interference included in the pilot signal sample.

In 1303, the communication terminal determines a channel autocorrelation matrix for the plurality of communication channels.

In 1304, the communication terminal determines a linear transformation which diagonalizes or triagonalizes the autocorrelation matrix.

In 1305, the communication terminal transforms the interference matrix by the transformation.

In 1306, the communication terminal reduces the transformed interference matrix by discarding components corresponding to predetermined eigenvectors of the autocorrelation matrix.

In 1307, the communication terminal determines filter weights for the signal samples based on the reduced interference matrix.

In 1308, the communication terminal determines channel estimates by filtering the pilot signal samples using the determined filter weights.

Figure 14:
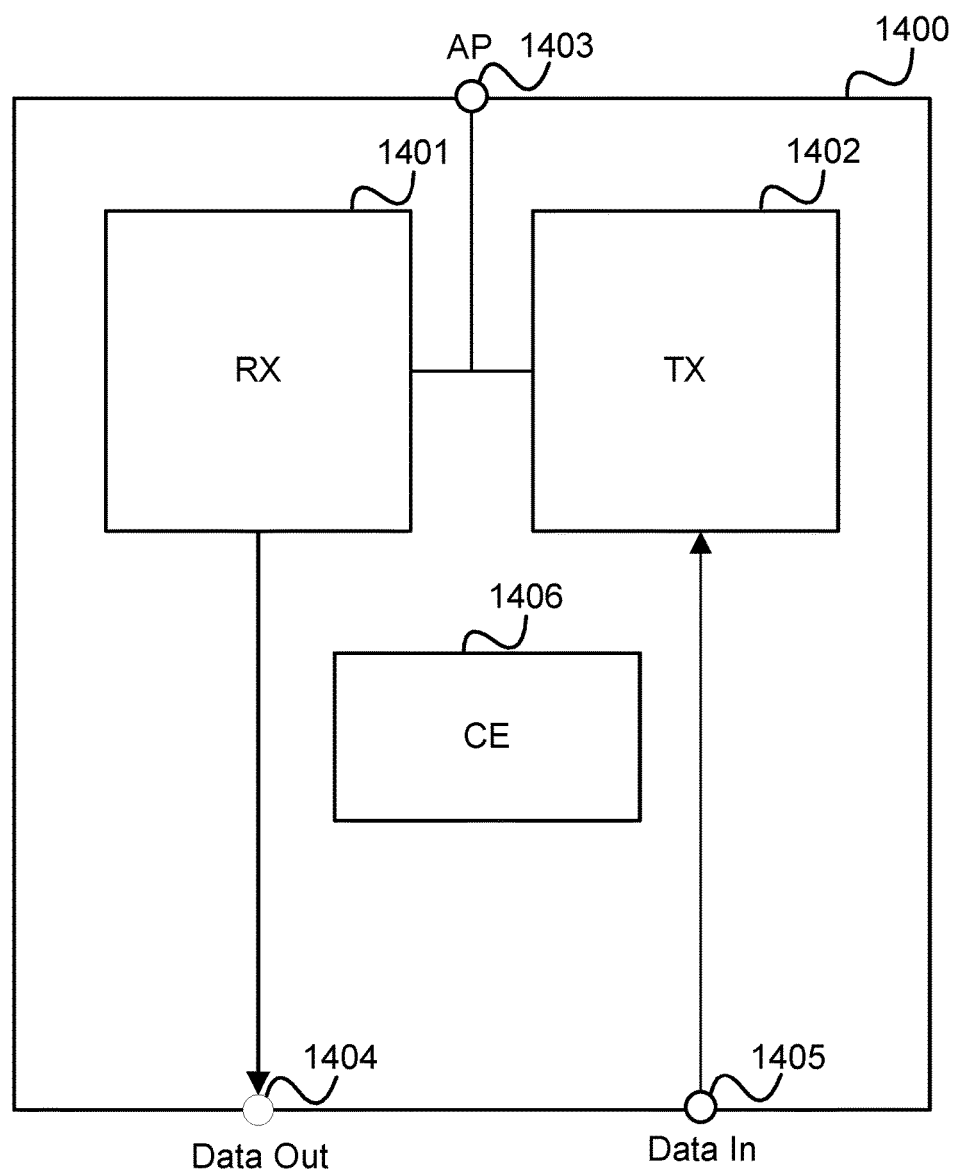
FIG. 14 shows a transceiver which may for example perform the method illustrated in FIG. 13.

FIG. 14 shows a transceiver 1400 which may for example perform the method illustrated in FIG. 13.

The transceiver 1400 may for example be part of the communication terminal 1200, such as a UE 105.

The transceiver comprises 1400 an RX (receiver) part 1401 and a TX (transmitter) part 1402. The RX part 1401 and the TX part 1402 are coupled to one or more antenna ports 1403. The RX part 1401 receives signals from one or more antennas and provides output data based on the received signals via a data output 1404. The TX part 1402 receives data to be sent via a data input 1405 and transmits signals based on the data to be sent via the one or more antennas.

Further, the RX part 1401 is configured to receive pilot signal samples via a plurality of communication channels and to determine an interference matrix which includes, for each pilot signal sample, interference information representing an amount of interference included in the pilot signal sample.

The transceiver further comprises a channel estimator 1406 configured to determine a channel autocorrelation matrix for the plurality of communication channels and to determine a linear transformation which diagonalizes or triagonalizes the autocorrelation matrix, to transform the interference matrix by the transformation and to reduce the transformed interference matrix by discarding components corresponding to predetermined eigenvectors of the autocorrelation matrix, to determine filter weights for the signal samples based on the reduced interference matrix and to determine channel estimates by filtering the pilot signal samples using the determined filter weights.

Figure 15:
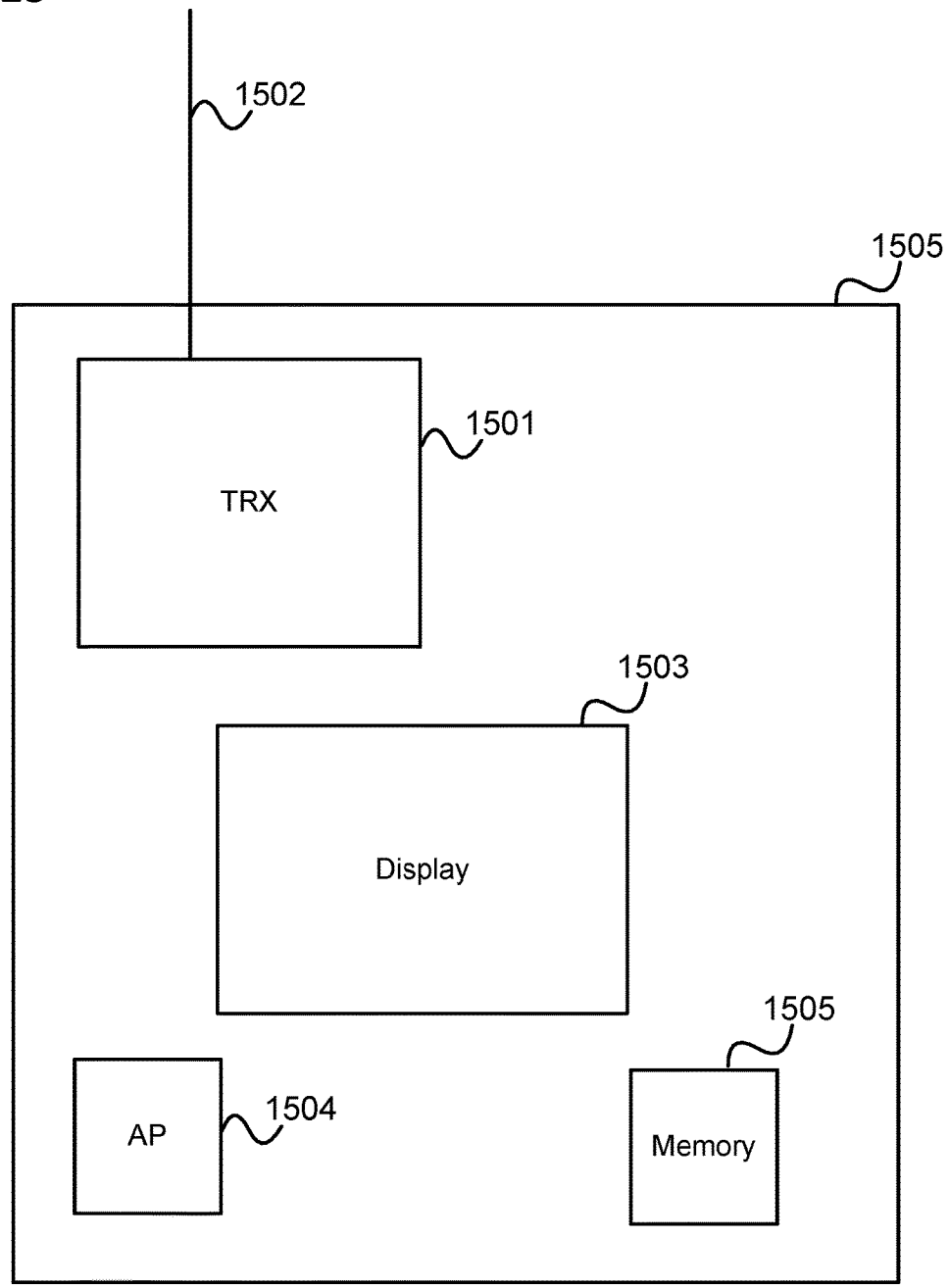
FIG. 15 shows a communication terminal comprising the transceiver of FIG. 14.

FIG. 15 shows a communication terminal 1500 comprising the transceiver 1400.

The communication terminal 1500 is for example a UE and comprises a transceiver 1501 corresponding to the transceiver 1400. The communication terminal 1500 further comprises one or more antennas and other typical components of a communication terminal such as a display 1503, an application processor 1504 and a memory 1505.

The following non-limiting examples pertain to further embodiments.

Example 1 is a communication terminal as illustrated in FIG. 12.

In Example 2, the subject matter of Example 1 may optionally include the predetermined eigenvectors being those eigenvectors whose eigenvalues being below a predetermined threshold.

In Example 3, the subject matter of any one of Examples 1-2 may optionally include the predetermined eigenvectors being the eigenvectors of a predetermined set of eigenvectors.

In Example 4, the subject matter of any one of Examples 1-3 may optionally include the predetermined eigenvectors being those eigenvectors which, according to a numbering of the eigenvectors, being eigenvectors having a number above a predetermined threshold.

In Example 5, the subject matter of Example 4 may optionally include the channel estimator being configured to determine the threshold based on at least one of the channel selectivity of the plurality of communication channels or a measure of the signal-to-noise ratio of the communication channels.

In Example 6, the subject matter of any one of Examples 1-5 may optionally include the pilot signals being transmitted according to Orthogonal Frequency Division Multiplexing and each communication channel corresponds to a plurality of subcarriers.

In Example 7, the subject matter of any one of Examples 1-6 may optionally include the interference matrix being a diagonal matrix having, for each sample, an entry on its diagonal specifying a signal to interference and noise ratio of the sample.

In Example 8, the subject matter of any one of Examples 1-7 may optionally include the channel estimator being configured to reduce the transformed interference matrix by deleting, for each predetermined eigenvector of the autocorrelation matrix, the ith row and the ith column from the transformed interference matrix if the eigenvector corresponds to the ith eigenvalue of the autocorrelation matrix according to the diagonalization or the triagonalization of the autocorrelation matrix.

In Example 9, the subject matter of any one of Examples 1-8 may optionally include the channel estimator being configured to determine filter weights for the signal samples based on the inverse of a sum including the reduced interference matrix.

In Example 10, the subject matter of Example 9 may optionally include the channel estimator being configured to invert the sum of the reduced interference matrix and an identity matrix and to determine filter weights for the signal samples based on the inverted sum.

In Example 11, the subject matter of Example 10 may optionally include the channel estimator being configured to apply the inverse of the linear transformation, reduced correspondingly to the reduction of the transformed interference matrix, to the inverted sum to generate a retransformed matrix, and, for generating the filter weight for a sample, to multiply the retransformed matrix with the interference matrix from the left and with a cross-correlation vector between the sample and the samples from the right.

In Example 12, the subject matter of any one of Examples 1-11 may optionally include the channel estimator being configured to determine the channel autocorrelation matrix based on channel parameters of the plurality of communication channels.

In Example 13, the subject matter of Example 12 may optionally include the channel parameters including at least one of delay spread and shift and Doppler spread and shift of the communication channels.

In Example 14, the subject matter of any one of Examples 1-13 may optionally include the channel estimator being configured to determine the filter weights for the signal samples based on the reduced interference matrix in response to the detection of interference selectivity of the communication channels.

In Example 15, the subject matter of any one of Examples 1-14 may optionally include the transformation being an eigen-decomposition, a QR decomposition or a Cholesky decomposition.

Example 16 is a method for channel estimation as illustrated in FIG. 13.

In Example 17, the subject matter of Example 16 may optionally include the predetermined eigenvectors being those eigenvectors whose eigenvalues being below a predetermined threshold.

In Example 18, the subject matter of any one of Examples 16-17 may optionally include the predetermined eigenvectors being the eigenvectors of a predetermined set of eigenvectors.

In Example 19, the subject matter of any one of Examples 16-18 may optionally include the predetermined eigenvectors being those eigenvectors which, according to a numbering of the eigenvectors, being eigenvectors having a number above a predetermined threshold.

In Example 20, the subject matter of one of Example 19 may optionally include determining the threshold based on at least one of the channel selectivity of the plurality of communication channels or a measure of the signal-to-noise ratio of the communication channels.

In Example 21, the subject matter of any one of Examples 16-20 may optionally include transmitting the pilot signals according to Orthogonal Frequency Division Multiplexing wherein each communication channel corresponds to a plurality of subcarriers.

In Example 22, the subject matter of any one of Examples 16-21 may optionally include the interference matrix being a diagonal matrix having, for each sample, an entry on its diagonal specifying a signal to interference and noise ratio of the sample.

In Example 23, the subject matter of any one of Examples 16-22 may optionally include reducing the transformed interference matrix by deleting, for each predetermined eigenvector of the autocorrelation matrix, the ith row and the ith column from the transformed interference matrix if the eigenvector corresponds to the ith eigenvalue of the autocorrelation matrix according to the diagonalization or the triagonalization of the autocorrelation matrix.

In Example 24, the subject matter of any one of Examples 16-23 may optionally include determining filter weights for the signal samples based on the inverse of a sum including the reduced interference matrix.

In Example 25, the subject matter of Example 24 may optionally include inverting the sum of the reduced interference matrix and an identity matrix and to determine filter weights for the signal samples based on the inverted sum.

In Example 26, the subject matter of Example 25 may optionally include applying the inverse of the linear transformation, reduced correspondingly to the reduction of the transformed interference matrix, to the inverted sum to generate a retransformed matrix, and, for generating the filter weight for a sample, multiplying the retransformed matrix with the interference matrix from the left and with a cross-correlation vector between the sample and the samples from the right.

In Example 27, the subject matter of any one of Examples 16-26 may optionally include determining the channel autocorrelation matrix based on channel parameters of the plurality of communication channels.

In Example 28, the subject matter of Example 27 may optionally include the channel parameters including at least one of delay spread and shift and Doppler spread and shift of the communication channels.

In Example 29, the subject matter of any one of Examples 16-28 may optionally include determining the filter weights for the signal samples based on the reduced interference matrix in response to the detection of interference selectivity of the communication channels.

In Example 30, the subject matter of any one of Examples 16-29 may optionally include the transformation being an eigen-decomposition, a QR decomposition or a Cholesky decomposition.

Example 31 is a computer readable medium having recorded instructions thereon which, when executed by a processor, make the processor perform a method for channel estimation according to any one of Examples 16 to 30.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:
1. A communication terminal comprising
a receiver configured to receive pilot signal samples via a plurality of communication channels and to determine an interference matrix which includes, for each pilot signal sample, interference information representing an amount of interference included in the pilot signal sample; and a channel estimator configured to determine a channel autocorrelation matrix for the plurality of communication channels and to determine a linear transformation which diagonalizes or triangulates the autocorrelation matrix;

to transform the interference matrix by the transformation and to reduce the transformed interference matrix by discarding components corresponding to predetermined eigenvectors of the autocorrelation matrix;

to determine filter weights for the signal samples based on the reduced interference matrix; and to determine channel estimates by filtering the pilot signal samples using the determined filter weights.

2. The communication terminal according to claim 1, wherein the predetermined eigenvectors are those eigenvectors whose eigenvalues are below a predetermined threshold.

3. The communication terminal according to claim 1, wherein the predetermined eigenvectors are the eigenvectors of a predetermined set of eigenvectors.

4. The communication terminal according to claim 1, wherein the predetermined eigenvectors are those eigenvectors which, according to a numbering of the eigenvectors, are eigenvectors having a number above a predetermined threshold.

5. The communication terminal according to claim 4, wherein the channel estimator is configured to determine the threshold based on at least one of the channel selectivity of the plurality of communication channels or a measure of the signal-to-noise ratio of the communication channels.

6. The communication terminal according to claim 1, wherein the pilot signals are transmitted according to Orthogonal Frequency Division Multiplexing and each communication channel corresponds to a plurality of subcarriers.

7. The communication terminal according to claim 1, wherein the interference matrix is a diagonal matrix having, for each sample, an entry on its diagonal specifying a signal to interference and noise ratio of the sample.

8. The communication terminal according to claim 1, wherein the channel estimator is configured to reduce the transformed interference matrix by deleting, for each predetermined eigenvector of the autocorrelation matrix, the ith row and the ith column from the transformed interference matrix if the eigenvector corresponds to the ith eigenvalue of the autocorrelation matrix according to the diagonalization or the triangulation of the autocorrelation matrix.

9. The communication terminal according to claim 1, wherein the channel estimator is configured to determine filter weights for the signal samples based on the inverse of a sum including the reduced interference matrix.

10. The communication terminal according to claim 9, wherein the channel estimator is configured to invert the sum of the reduced interference matrix and an identity matrix and to determine filter weights for the signal samples based on the inverted sum.

11. The communication terminal according to claim 10, wherein the channel estimator is configured to apply the inverse of the linear transformation, reduced correspondingly to the reduction of the transformed interference matrix, to the inverted sum to generate a retransformed matrix, and, for generating the filter weight for a sample, to multiply the retransformed matrix with the interference matrix from the left and with a cross-correlation vector between the sample and the samples from the right.

12. The communication terminal according to claim 1, wherein the channel estimator is configured to determine the channel autocorrelation matrix based on channel parameters of the plurality of communication channels.

13. The communication terminal according to claim 12, wherein the channel parameters include at least one of delay spread and shift and Doppler spread and shift of the communication channels.

14. The communication terminal according to claim 1, wherein the channel estimator is configured to determine the filter weights for the signal samples based on the reduced interference matrix in response to the detection of interference selectivity of the communication channels.

15. The communication terminal according to claim 1, wherein the transformation is an eigen-decomposition, a QR decomposition or a Cholesky decomposition.

16. A method for channel estimation comprising:

receiving pilot signal samples via a plurality of communication channels;

determining an interference matrix which includes, for each pilot signal sample, interference information representing an amount of interference included in the pilot signal sample;

determining a channel autocorrelation matrix for the plurality of communication channels;

determining a linear transformation which diagonalizes or triangulates the autocorrelation matrix;

transforming the interference matrix by the transformation;

reducing the transformed interference matrix by discarding components corresponding to predetermined eigenvectors of the autocorrelation matrix;

determining filter weights for the signal samples based on the reduced interference matrix; and determining channel estimates by filtering the pilot signal samples using the determined filter weights.

17. The method according to claim 16, wherein the predetermined eigenvectors are those eigenvectors whose eigenvalues are below a predetermined threshold.

18. The method according to claim 16, wherein the predetermined eigenvectors are the eigenvectors of a predetermined set of eigenvectors.

19. The method according to claim 16, wherein the predetermined eigenvectors are those eigenvectors which, according to a numbering of the eigenvectors, are eigenvectors having a number above a predetermined threshold.

20. A non-transitory computer readable medium having recorded instructions thereon which, when executed by a processor, make the processor perform a method for channel estimation according to claim 16.

* * * * *